United States Patent Office 2,977,207
Patented Mar. 28, 1961

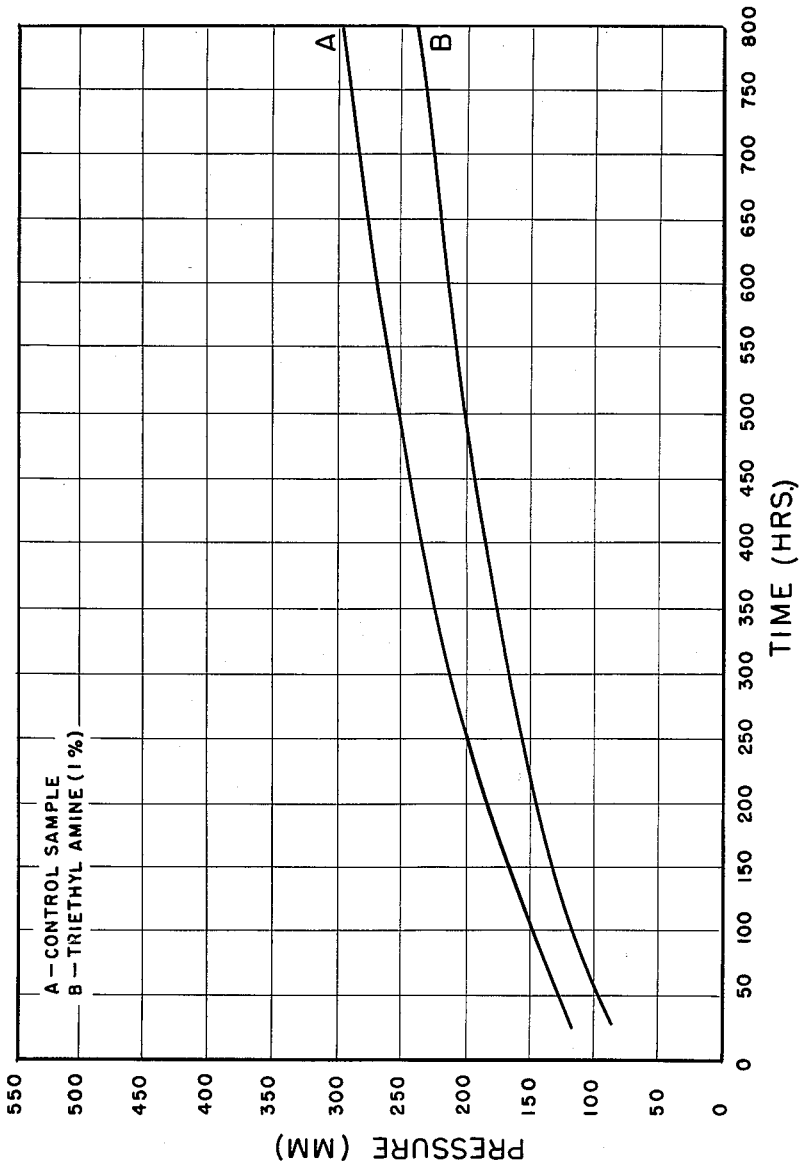

2,977,207

STABILIZATION OF DIBORANE-ALKYNE REACTION PRODUCT WITH TRIETHYLAMINE

Joel A. Zaslowsky, Niagara Falls, N.Y., assignor, by mesne assignments, to Olin Mathieson Chemical Corporation, a corporation of Virginia Filed May 21, 1956, Ser. No. 586,313

2 Claims. (Cl. 52—.5)

This invention relates to the stabilization of liquid borohydrocarbons produced by reacting diborane and acetylene or methylacetylene.

The production of liquid borohydrocarbons has been previously proposed by the reaction of diborane and unsaturated hydrocarbons in the gaseous phase and in admixture with an inert diluent gas at temperatures elevated by direct or indirect heat exchange. Such liquid borohydrocarbons have high heats of combustion and are useful as high energy fuels when burned with air, for example, as described in application Serial No. 533,944, filed September 13, 1955, in the names of Earl A. Weilmuenster and Joel A. Zaslowsky. In addition to having high heats of combustion, however, high energy fuels should be characterized by, for example, low vapor pressure, low viscosity, slight tendency to be pyrophoric, low toxicity, low freezing point and good storage stability. Although the liquid borohydrocarbons produced by the reaction of diborane and unsaturated hydrocarbons described above have satisfactory storage stability, it has now been found that certain of these liquid borohydrocarbons, particularly those produced by the reaction of diborane and acetylene or methyl acetylene can be further stabilized with respect to vapor pressure without undue change in other properties by incorporation into the borohydrocarbons of particularly small amounts of triethylamine.

Thus according to the method of this invention liquid reaction products of diborane and acetylene or methylacetylene are stabilized with respect to vapor pressure by incorporation into such reaction products of about 0.05 to 2.0 per cent by weight of triethylamine.

The invention will be further illustrated by the following example:

EXAMPLE I

*Part 1.*—A mixture of hydrogen and diborane is reacted with a mixture of hydrogen and methylacetylene. The apparatus employed comprises a heating coil surrounding a dispersion tube longitudinally situated in the center of an elongated jacketed reaction chamber. The heating coil and jacket are connected in series and mineral oil at 140° C. is circulated through the system. The dispersion tube contains a number of small holes of about 1 mm. diameter. A thermocouple inserted into a glass tube situated at the lower end of the dispersion tube measures the reaction temperature. The mixture of hydrogen and methyl acetylene is passed into the dispersion tube, the mixture of hydrogen and diborane is introduced into the concentric space surrounding the dispersion tube, and when the reactor is at the proper temperature, the reaction is initiated and proceeds smoothly. The reaction product is condensed in a series of traps cooled to −78° C. The pertinent data with respect to two runs are set out in Table I below.

*Table 1*

REACTION OF DIBORANE WITH METHYL-ACETYLENE

| | | |
|---|---|---|
| Operating Time, Min. | 393 | 286 |
| Observed Operating Temperature, ° C. | 125–166 | 130–158 |
| Ratio, $H_2:B_2H_6:C_3H_4$ | 10:3:1 | 10:3:1 |
| Flow Rate, $B_2H_6$, cc./min. | 661 | 566 |
| Flow Rate, $C_3H_4$, cc./min. | 215 | 217 |
| Flow Rate, $H_2$, cc./min. | 2,275 | 2,275 |
| Materials In Moles: | | |
| $B_2H_6$ | 11.59 | 7.23 |
| $CH_3C:CH$ | 3.78 | 2.78 |
| $H_2$ | 39.60 | 29.10 |
| Materials Out: | | |
| Product, grams | 165 | 98 |
| Percent B (Av. values) | 30.8 | 29.2 |

The liquid products of these two runs are combined.

*Part 2.*—A portion of the combined liquid products of Part 1 are then stabilized by the addition thereto of 1 percent by weight of triethylamine.

The absolute pressure exerted by the untreated and triethylamine containing products is measured with a bubble-off manometer. Approximately five milliliters of material is sealed in a tube, equipped with a break seal, which is sealed to the manometer. With the sample frozen in a liquid nitrogen bath, the entire system is evacuated and then isolated by closing the stopcock. The sample then is allowed to warm to room temperature. Pressure readings are taken daily for the first week and thereafter weekly, for the duration of the test. All pressure readings of the sealed sample are corrected for changes in barometric pressure.

The time-pressure relationship of the triethylamine containing reaction product together with that of the control sample is presented in the accompanying figure. This figure indicates that the incorporation of triethylamine into the methyl acetylene-diborane reaction product improves the stability of the product.

Although the process of this invention has been described with respect to the particular diborane-methylacetylene reaction products of Example I, the process of this invention is applicable to such reaction products produced according to less limited ranges of reaction conditions. For example, the temperatures employed may range from about 100° C. to 250° C. The relative amounts of diborane and acetylene hydrocarbons used can be varied widely, the molar ratio of diborane to acetylene hydrocarbon being within the range from 0.5:1 to 10:1. The amounts of diluent gas such as hydrogen, nitrogen, argon, or mixtures thereof, can also be varied widely, the amount so introduced in practice being dependent upon the amount of diluent required to effect essential mixing and heat transfer necessary for any particular mode of operation. In general, the gases entering the reaction system (diborane, acetylene hydrocarbon and diluent gas) will be composed of from about 20 to 90 percent by volume of diluent gas. Instead of the indirect heat exchange system described in Example I for initiating and maintaining the appropriate reaction temperature, a direct heat exchange system may be employed such as, for example, a mass of mercury through which the reactant gases are passed.

I claim:
1. A method for the stabilization with respect to vapor pressure of liquid reaction products of diborane and a material selected from the class consisting of acetylene and methyl acetylene which comprises incorporating into the liquid reaction products about 0.05 to 2.0 weight percent of triethylamine.

2. A method for the stabilization with respect to vapor pressure of liquid reaction products of diborane and methyl acetylene which comprises incorporating into the liquid reaction products about 0.05 to 2.0 weight percent of triethylamine.

No references cited.